United States Patent [19]

Lewis

[11] Patent Number: 5,398,335
[45] Date of Patent: Mar. 14, 1995

[54] VIRTUALLY UPDATING DATA RECORDS BY ASSIGNING THE UPDATE FRACTIONAL ADDRESSES TO MAINTAIN AN ORDINAL RELATIONSHIP WITHOUT RENUMBERING ORIGINAL RECORDS

[76] Inventor: Eric R. Lewis, 2026 Yahara Pl., Madison, Wis. 53704

[21] Appl. No.: 938,969

[22] Filed: Sep. 1, 1992

[51] Int. Cl.$^6$ .......................................... G06F 15/417
[52] U.S. Cl. ..................................... 395/600; 395/400;
364/255.2; 364/256.6; 364/DIG. 1; 364/962.1;
364/DIG. 2
[58] Field of Search ........................ 395/600, 400, 425;
364/255.2, 256.6, 962.1

[56] References Cited

U.S. PATENT DOCUMENTS

| | | | |
|---|---|---|---|
| 4,682,305 | 7/1987 | Ishikawa | 395/425 |
| 4,760,526 | 7/1988 | Takeda et al. | 395/600 |
| 4,953,122 | 9/1990 | Williams | 395/400 |
| 5,308,916 | 5/1994 | Murata et al. | 84/603 |
| 5,313,567 | 5/1994 | Civanlar et al. | 395/124 |

OTHER PUBLICATIONS

Key-sequence data sets on indelible storage, by Malcolm C. Easton, IBM, J. Res. Develop. vol. 30 No. 3, May 1986.

Differential Files: Their Application to the Maintenance of Large Databases, by Dennis G. Severance et al., ACM Transactions on Database Systems, vol. 1, No. 3, Sep. 1976, pp. 256-267.

Chapters 6 and 14 of Optical Publishing, CD ROM, vol. Two, edited by Ropiequet, Microsoft Press 1987.

Primary Examiner—Thomas G. Black
Assistant Examiner—J. Choules
Attorney, Agent, or Firm—Quarles & Brady

[57] ABSTRACT

A method of updating a database of records with an update database assigns fractional pseudo addresses to each of the update records. If an update database exists, the update records are first read within the range defined by a desired integer database address and the next greater integer address and those records are read preferentially over comparable records of the original database. Pseudo addresses associated with a delete address pointer serve the function of deleting records while duplications between the update pseudo addresses and the original physical addresses of the database allow changing of the records of original database.

6 Claims, 5 Drawing Sheets

VIRTUALLY UPDATING DATA RECORDS BY ASSIGNING THE UPDATE FRACTIONAL ADDRESSES TO MAINTAIN AN ORDINAL RELATIONSHIP WITHOUT RENUMBERING ORIGINAL RECORDS

BACKGROUND OF THE INVENTION

This invention relates to software for managing a database of records on a computer and, in particular, software for allowing large databases to be updated with new records while preserving the ordered structure of the database and without the rewriting of the database or significant sacrifices in the speed of record retrievals.

BACKGROUND ART

Among the earliest uses of computers was that of managing the storage and retrieval of selected pieces of information, "records", from a database or large body of information, for example, the storage or retrieval of information regarding certain individuals from census records of many individuals. The value of using a computer in managing such databases lies in the computer's ability to rapidly search through the stored records and thus to make the information contained in the stored records accessible in a meaningful way.

The increasing size of useful databases of stored records continually challenges the speed and addressing capabilities of existing computer hardware. Thus, efficient methods of structuring the database, and of retrieval and storage of records, remains an important part of providing effective access to information in large databases.

Typically, an efficient database requires that the records of the database be ordered or "cataloged" in some predetermined manner to speed the retrieval process. In an example database of an index of books in a library, i.e., a card catalog, the data of each record "card" might be arranged alphabetically by title, author or subject, much in the way cards are in a conventional card catalog. Thus, for common searches, such as for a title of a book, every record need not be reviewed and search time is dramatically decreased.

Unfortunately, such structuring of records, where the position or address of each record in the database is fundamentally related to the content of the record, creates a problem in updating the database. For example, if a record for a new book is to be added to the database and the order of the records is to be preserved, the card must be added generally to some point in the middle of the database. Because the records of the database are stored contiguously for efficient use of the storage medium, the insertion of such a record requires that every record following the inserted record be shuffled downward to create a new space. This shuffling is extremely time-consuming in most cases and for certain storage media, such as optical disks which cannot be rewritten, such a reshuffling is impossible.

One strategy for dealing with updating of databases having a predetermined ordering of their records, termed henceforth "ordinal databases", is to leave blank records at periodic locations throughout the database. These blank records are left to reduce the amount of rewriting necessary for the updating. The drawback to this approach is that the storage medium is not used efficiently because a significant percentage of it must remain blank. This approach is generally also not suitable for read only storage media.

It should be noted that the reordering of the actual records of the database may be reduced by the use of a relational file which cross-references actual records to effective address locations of the relational file, such effective addresses conforming to the desired ordinal relationship for the records. That is, the search is performed on the relational file which holds addresses pointing to actual records. Thus, the actual records may be in any order with the relational file implicitly reordering them. Nevertheless, the relational file experiences the same problems of updating experienced by the database. That is, as new records are added, the relational file must be updated while preserving the order of the records within the relational file. Again, if the relational file is large or on a read only storage medium, the shuffling of data required by such updating becomes unwieldy or impossible.

The problem of updating large databases is compounded by the need to provide not only for the addition of new records but for the removal or correction of existing records. Any updating method for ordinal databases must address these concerns.

SUMMARY OF THE INVENTION

The present invention provides a method of retrieving information from an updated database, which method preserves the ordinal quality of the database. In particular, this method neither limits the amount of updating nor significantly increases the retrieval time of the records.

Generally, the method creates an "elastic" data space by employing rational fraction pseudo addresses in conjunction with physical integer addresses for the various records of the database. Because an arbitrary number of rational fraction pseudo addresses may fit between any two integer physical addresses, the database may be arbitrarily expanded while preserving the ordinal quality of the records. The ordinal ranking of the updated records is defined by the values of the addresses of the records, pseudo or physical, fractional or integer.

For example, between the records with physical addresses 42 and 43, an update record having an address of 42.1 may be added. More than just ten additional update files may be added by employing addresses such as 4.12 or 4.125. The decimal part of the address may be increased arbitrarily to accommodate additional updates. Yet each new record remains clearly ordered with respect to the old records.

The present invention practically implements the concept of an elastic data space with electronic computer hardware. In particular, the method derives an integer key address corresponding to a received index term. A pseudo address having a value offset from the value of the integer key address, by a predetermined fractional increment, is then built. This pseudo address typically will be the key address plus the predetermined fractional part. An update relation file is then reviewed to determine if the pseudo address is in the update relation file. If so, an integer physical address associated with the found pseudo address is used to retrieve the desired record; if not, the integer key address is used as a physical address to retrieve the desired record.

It is a first object of the invention, then, to provide an updating means that accommodates an arbitrary number of update records. The fractional part of the pseudo addresses may be expanded rightward as needed to allow for additional address spaces between any two preexisting addresses.

It is a further object of the invention to preserve the ordinal qualities of the records in the database. The pseudo addresses allow the update records to fit within the original ordering of the database records and to maintain an ordering with respect to themselves. The ability to order the update file in a manner similar to the original file further allows the determination of whether an update exists in the update file to be made rapidly, eliminating cumbersome searching for updates when there are none.

The pseudo address may have an integer value and thus duplicate a value of an actual physical address. In this case, the record indicated by the pseudo address is selected in lieu of the record at the physical address.

Thus it is another object of the invention to provide a method not only of adding new records but of changing preexisting records.

The pseudo address, alternatively, may identify a delete address that does not point to an actual record but that simply causes the record not to be read for that pseudo address.

It is thus another object of the invention to provide the updating means including a means for deleting existing records.

Other objects of the invention and advantages besides those discussed above shall be apparent to those experienced in the art from the description of the preferred embodiment of the invention which follows. In the description, reference is made to the accompanying drawings, which form a part hereof, and which illustrate one example of the invention. Such an example, however, is not exhaustive of the various alternative forms of the invention and, therefore, reference is made to the claims which follow the description for determining the scope of the invention.

DETAILED DESCRIPTION OF THE PREFERRED EMBODIMENT

Hardware

Figure 1:
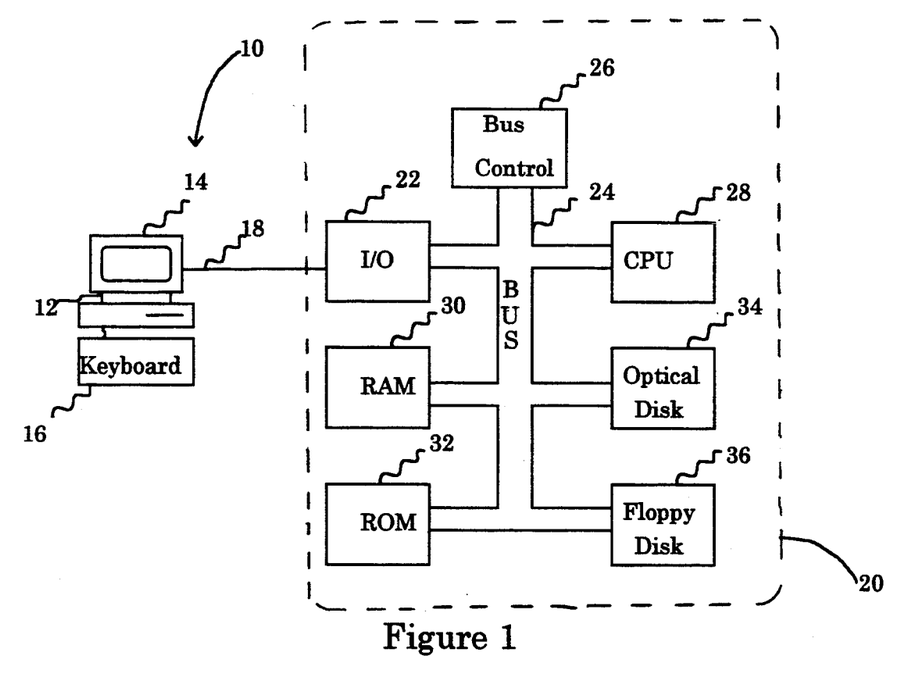
FIG. 1 is a block diagram of a computer system incorporating an optical disk holding the original database and a floppy disk for holding an update database.

Referring to FIG. 1, a computer system 10 suitable for use in implementing the database system of the present invention includes a terminal 12 having a display 14, such as a CRT, suitable for displaying the information to be retrieved from the database, and a data entry device 16, such as a keyboard, suitable for entering index terms or other instructions as will be described.

The terminal 12 communicates via a link 18 with the processor system 20, the signals from the link being received by I/O circuit 22 which translates between the signals on the link 18 and an internal bus 24 under the control of bus controller 26, as is generally understood in the art. The bus 24 and bus controller 26 serve to interconnect the various components of the processor system 20 and, through the I/O circuit 22, the terminal 12.

One of these components of the processor system 20 is the central processing unit ("CPU") 28 which executes a stored program typically contained in a random access memory ("RAM") 30 or a read only memory ("ROM") 32. This stored program implements the database management operations of the present invention and will be described in detail below. The RAM 30 also holds various temporary values or variables employed by this program as will be well understood by those of ordinary skill in the art.

The bus 24 connects the CPU 28 and the RAM 30 and ROM 32 together. Also attached to the bus 24 is optical disk 34 containing the primary database to be described below and a floppy disk 36 containing the update database, as will also be described. Each of these components will be well understood to those of ordinary skill in the art and together describe the architecture of a general Von Neumann computing system suitable for practice of the present invention.

In operation, a user of the computer system 10 will request certain records held in the database on the optical disk 34 and floppy disk 36 by entering commands through data entry device 16. The database program operating on the CPU 28 will read the required records from the optical disk 34 and the floppy disk 36 and transmit those records via the link 18 to the terminal 12 to be read by the user on the display 14.

Optical disk 34 is a compact disk read only memory such as was originally devised for audio use. Such optical disks 34 presently have a capacity of approximately 550 to 680 megabytes of storage as compared to 0.36 to 1.2 megabytes for the floppy disk 36. In the example described below, it is contemplated that the original database will be held on the optical disk 34 and the update database will be held on the floppy disk 36, however, the present method does not require that the update database be smaller than the original database or that either database be of any particular size.

Data Structures

Figure 2:
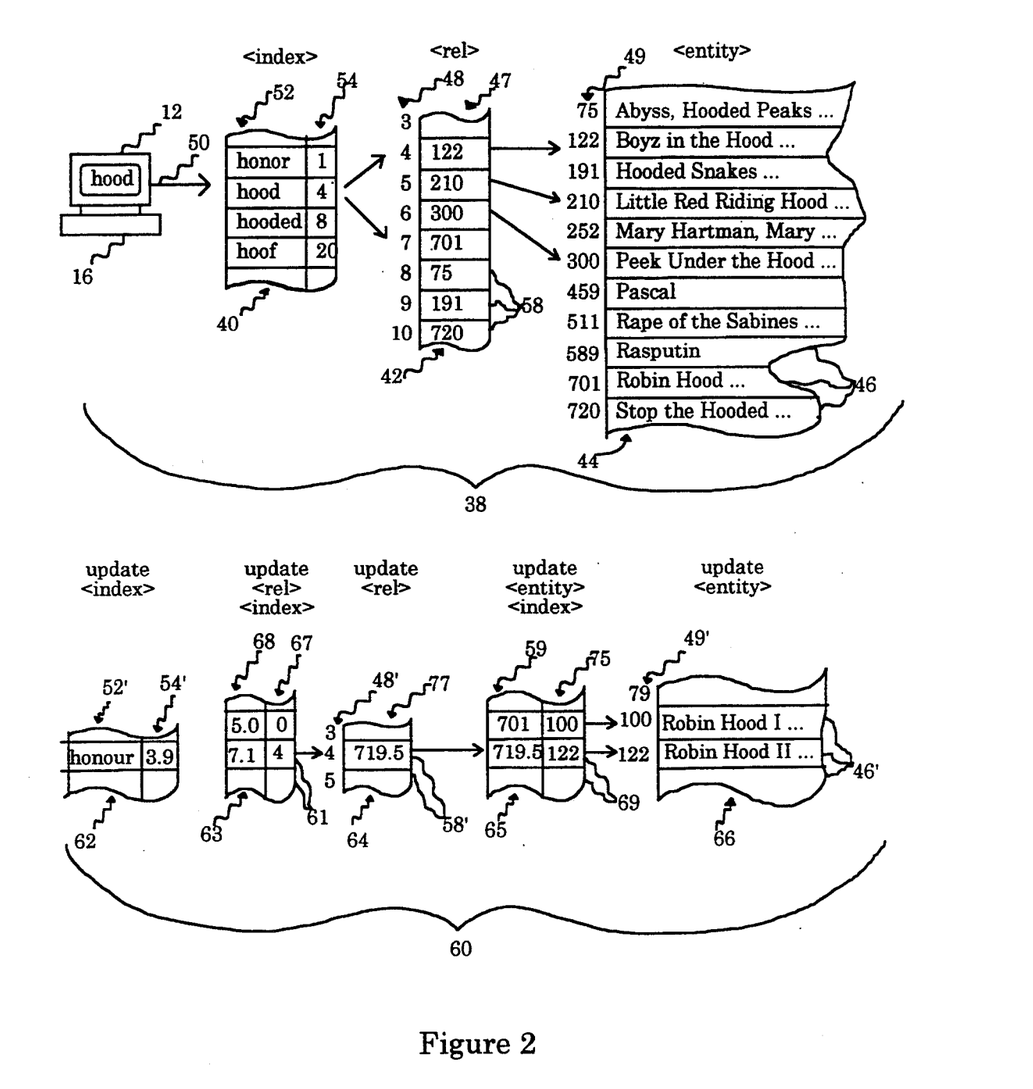
FIG. 2 is a pictorial representation of the data structures of the original and update databases as might implement a database for a library card catalog.

Referring now to FIG. 2, the original database 38 includes three files: an index file (<index>) 40, a relation file (<rel>) 42, and an entity file (<entity>) 44. The <entity> file 44 is comprised of a series of records 46 which represent the data ultimately to be retrieved. Each record 46 may, for example, be the contents of one card in a library card catalog including the title of the book referenced by the card, as illustrated.

The records 46 are comprised of sequences of bytes on the optical disk 34 encoding the data of the record 46, for example, the letters of the book's title. Each byte of data of each record 46 has a given physical address related to its position on the optical disk 34, and each of the records 46 may be identified by a physical address 49 marking the first byte of that record 46.

It is important to note that the records 46 are in general of variable lengths and therefore the physical addresses 49 of the records 46 are not evenly spaced. In the present invention, the records 46 are stored contiguously with no gaps between records, to efficiently use the optical disk 34.

During a search of the original database 38, an index term 50, such as a word found in titles of books to be identified, is entered by the user on data entry device 16. This index term 50 is matched to a corresponding index term 52 in the <index> file 40 which links the index term 50 through the corresponding index term 52 to an integer key number 54. For example, if the index term is "hood", an integer key number 54 of 4 may be identified. The <index> file 40 is typically much smaller than the <entity> file 44 and may be arranged according to conventional balanced tree ("B-tree") structures well known in the art allowing for rapid searching of the index terms 52.

The integer key number 54 obtained from the <index> file 40 indicates a physical address 48 of an entry 58 in the <rel> file 42 and, in particular, points to the physical address 48 of the first entry 58 associated with the given index term 50. The range of values of physical address 48 that encompass all entries associated with the given index term 50 may be determined by examining the key number 54 associated with the index term 52 that immediately follows the specified index term 52 in the <index> file 40. In this example, the value for that integer key number 54 is 8. Thus the index term "hood" is identified to four entries 58 beginning at physical address 4 and proceeding to physical address 7.

Each of these entries 58 of the <rel> file 42 is a pointer to a physical address 49 of a record 46 of the <entity> file 44. Thus, in the example, the entry at physical address 4 of the <rel> file 42 may contain the physical address 122, which points to the physical address 122 of the <entity> file 44 and the book entitled "Boyz in the Hood ... ". The primary purpose of the <rel> file 42 is to permit efficient Boolean algebra operations using a combination of index terms 50 that result in finding a subset of records 46 that meet user specified Boolean expressions. We will not discuss the mechanics of Boolean algebra further here as it is well known to those familiar with the art. In a typical search of records 46 related to the index term 50, each of the records 46 pointed to by the entries 58 of the <rel> file 42 from physical address 4 through 7 will be collected.

The present invention contemplates that the original database 38 will be updated by an update database 60. Such an update database may include an update <index> file 62 and will include an update <rel> <index> file 63, an update <rel> file 64, an update <entity> <index> file 65, and an update <entity> file 66. The update <index> file 62 is required only if new index terms 52' are to be added. For the purpose of simplifying the description of the present invention, it will be assumed that no new index terms 52' are added. However, if such new index terms 52' are required, they may be integrated into the <index> file 40 according to standard balanced tree updating methods, such as that described in "*Key Sequence Data Sets On Indelible Storage*" by Malcolm C. Easton, IBM J. Res. Develop. Vol. 30 No. 3, May 1986 hereby incorporated by reference.

It will be assumed that the update database 60 will include only the update <rel> <index> file 63, the update <rel> file 64, the update <entity> <index> file 65, and the update <entity> file 66. The update <entity> file 66 includes new or changed records 46' such as card catalog information for new books or a replacement card with corrections. Each record 46' is located using an update <entity> <index> 65 similar to <index> file 40 except entries 69 link pseudo addresses 59 to records 46' indirectly using direct integer addresses 75 to point to a starting physical address 49' in the update storage device, being in this case the floppy disk 36.

The update <rel> file 64 differs from the original <rel> file 42 in that each entry 58' of the update <rel> file is associated not with a physical address 48' but with a pseudo address 68 by means of update <rel> <index> file 63. Importantly, the pseudo address 68 differs from a physical address in that it is not necessarily an integer. That is, generally, the pseudo address will include a fractional part. The pseudo address 68 serves as an index term in a B-Tree structured <rel> <index> file 63 similar to <index> file 40. The pseudo address 68 identifies a physical address 67 that, in turn, identifies a physical address 48' on the floppy disk 36 that contains the new or changed <rel> entry 58'. Although as shown in FIG. 2, the pseudo address 68 includes only a single place to the right of the decimal point more typically multiple places to the right of the decimal point will be employed and in the version implemented to date, thirty two places the right of the decimal point were employed.

Thus, each entry 61 of the update <rel> <index> file 63 links one pseudo address 68 to an associated physical address 67. The physical address 67 equals the physical address 48' of a new or changed entry 58' in the update <rel> file 64. Each entry 58' of the update <rel> file 64 identifies yet another pseudo address 77. The pseudo address 77 may reference an unchanged record 46 in <entity> file 44. Otherwise pseudo address 77 is used to locate a corresponding pseudo address 59 and to retrieve an <index> entry 69 in the update <entity> <index> file 65. An integer address 75 is associated with a pseudo address 59 by each <index> entry 69. The integer address 75 identifies a physical address 49' of a record 46' in the update <entity> file 66.

Software

Figure 3:
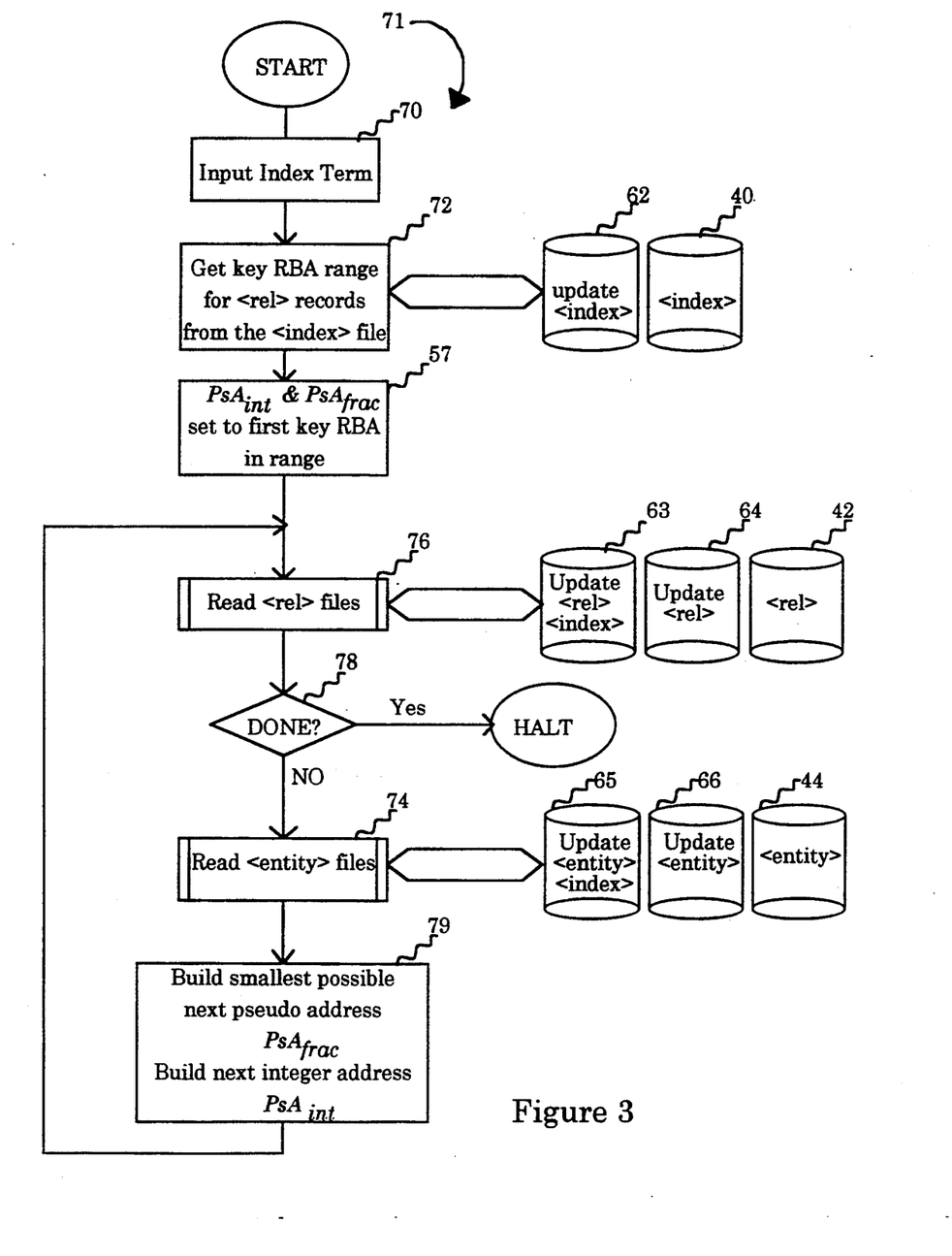
FIG. 3 is a flowchart showing generally the retrieval of information from the database of FIG. 2 on the computer of FIG. 1 and incorporating a random read routine and a sequential read routine.

Referring now also to FIG. 3, a reading of the databases 38 and 60 begins with process block 70 of a stored program 71 running on processor system 20 described above. At process block 70 an index term 50 such as the term "hood" is received from the terminal 12. At process block 72, the <index> file 40, as possibly updated by an update <index> file 62, is read to obtain the integer key number 54 (or pseudo address 54'). In the example shown in FIG. 2, this key number 54 is 4. The integer key number 54 or pseudo address 54' specifies the location of a first entry 58 or first entry 58' of a group of <rel> records that ultimately link the index term 50 to <entity> records 46 or 46' containing the index term 50. A second reading of <index> files 40 and 62 finds the integer key number 54 or pseudo address 54' associated with an index term 52 or 52' immediately following the specified index term 50 in the <index> file 40 or 63. In the example of FIG. 2, this second key number 54 is 8. This establishes a numeric range of physical 48 or pseudo 68 addresses for <rel> entries 58 or 58'. As discussed before, it will be assumed that the <index> file 40 has not been updated and hence a integer key number 54 is obtained.

At process block 57, two program variables $PsA_{int}$ and $PsA_{frac}$ are set equal to the integer key number 54 that is the beginning of the numerical range established in process block 72.

At <rel index> subroutine 76, the <rel> entry in <rel> file 42 or 63 that has the smallest physical address 48 or pseudo address 68 that is greater than or equal to (>=) $PsA_{int}$ and $PsA_{frac}$ is read. This will be described below with respect to FIG. 5.

Decision block 78 examines the physical address 48 or pseudo address 68 that was defined in process block 76 to determine if it remains within the numeric range established in process block 72.

If so, at subroutine 74, a first record 46 or 46' in either the <entity> file 44 or 66 is identified and read by reviewing the <rel> record found in subroutine 76. This subroutine will be described in detail below with respect to FIG. 4.

Next, process block 79 builds the smallest possible pseudo address that is greater than (>) the physical address 48 or pseudo address 68 of the entry in <rel> file 42 or <rel> <index> file 63 that was last read in subroutine 76. The variable named $PsA_{frac}$ is then set equal to this pseudo address value. The second variable $PsA_{int}$ is set equal to the smallest integer that is greater than (>) the physical address 48 or pseudo address 68. Processing is then transferred to subroutine 76, forming a processing loop. In essence, subroutine 76 performs a random read the first time it is invoked and a sequential read on the second and subsequent invocations.

The sequential reading of subroutine 76 is repeated by a loop formed with decision block 78, the later which checks to see if the physical address 48 or pseudo address 68 of the current <rel> entries 58 or 58' is in the range established in process block 72. When the sequential reading of subroutine 76 is finished, as determined at decision block 78, the program 71 stops.

Figure 5:
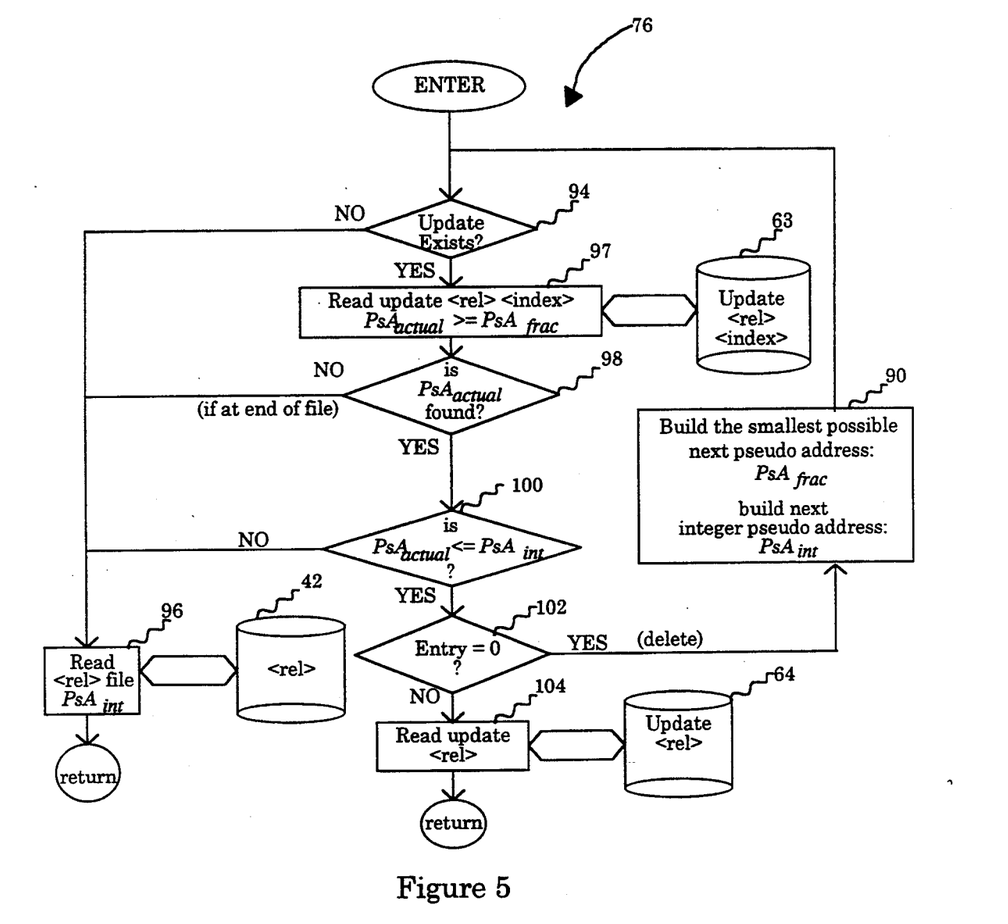
FIG. 5 is a flowchart showing the sequential read routine of FIG. 3.

Referring now to FIGS. 2, 3 and 5, the previously described subroutine 76 of FIG. 3, occurring after the numeric range of physical or pseudo addresses 48 or 68 is established in process block 72, includes a number of steps beginning with decision block 94 shown in FIG. 5. At decision block 94, the subroutine 76 checks to see if an update exists by checking for the existence of an update database 60 in the floppy disk 36 by determining whether a floppy disk 36 with an update database 60 is installed.

If no update database 60 exists, the subroutine 76 proceeds to process block 96 where the original <rel> file 42 is read according to $PsA_{int}$. Then the subroutine 76 returns to program 71.

If, however, at decision block 94 an update database 60 does exists, the subroutine 76 proceeds to process block 97 to read the update <rel> <index> file 63 to retrieve an entry with a pseudo address 68 having a value greater than or equal to (>=) $PsA_{frac}$. The actual pseudo address 68 read, if any, is saved as $PsA_{actual}$.

Next, if at decision block 98, no pseudo address $PsA_{actual}$ is found, the program proceeds to process block 96 to read the original entity file as described above. If, however, a pseudo address $PsA_{actual}$ is found, the program proceeds to decision block 100 and $PsA_{actual}$ is checked to see if it is less than or equal to (<=) $PsA_{int}$. If not, meaning that there are no update entries 58' within the relevant address range defined by the key number 54 and $PsA_{int}$, the program proceeds to process block 96 to read the original <entity> file 44. If on the other hand, the criteria of decision block 100 is met, the program advances to decision block 102. If the physical address 67 associated with $PsA_{actual}$ equals zero, denoting a deletion, then subroutine 76 proceeds back to process block 90 to build the next pseudo addresses $PsA_{frac}$ and $PsA_{int}$.

At process block 90, a next fractional pseudo address, $PsA_{frac}$, is built based on the key number 54. The value of $PsA_{frac}$ depends on the smallest allowable fractional increment which in turn depends on the anticipated amount of updating of the <entity> file 44. If, for example, the smallest fractional increment is 0.001, i.e., $PsA_{frac}$ includes three digits to the right of the decimal point, then one thousand update records 46' may potentially be "inserted" in between each original record 46, while preserving the ordinal quality of the database.

Assuming then that three places to the right of the decimal point are allowed, the next possible pseudo address, $PsA_{frac}$, will equal the key number 54 plus 0.001. For example, if the key or pseudo address employed previously was 4, $PsA_{frac}$, is 4.001.

In addition, the next integer pseudo address, $PsA_{int}$, is determined in process block 90. In our example, physical addresses of the <rel> files 42 and 64 are in unary increments. In practice, <rel> file entries 58 occupy several bytes, four to represent a 32 bit physical address. Thus, in practice, physical addresses 48 and 48' are in increments of four. $PsA_{int}$ is the next integer physical address larger than the key number 54.

Referring again to decision block 102, if the physical address 67 is not zero, then at process block 104, the update <rel> file 64 is read as indicated by the acquired physical address 67 and then the subroutine 76 returns.

This process may be illustrated by a simple example. Referring again to FIGS. 3 and 5, supposing at process block 79, the input $PsA_{frac}$ is 4. In a system with a resolution of one place to the right of the decimal point, the next smallest possible fractional pseudo address, $PsA_{frac}$, will be 4.1 and the next integer pseudo address $PsA_{int}$ will be 5.0. Assuming that an update database 60 exists, the update <rel> <index> file 63 will be read at process block 97 actual pseudo address, $PsA_{actual}$, being greater than or returning, in this example, a value of 5.0 as the next equal to (>=) the fractional pseudo address $PsA_{frac}$. Referring to FIG. 5, this pseudo address $PsA_{actual}$ (5.0) is less than or equal to (<=) the next integer pseudo address $PsA_{int}$ (5) as tested at process block 100.

If the physical address 67 of the update <rel> <index> file 63 identified by $PsA_{actual}$ is zero the program loops back through process block 90 to decision block 94 with the effect that there would be no reading of the physical address 5.0 of the original <rel> file 42. This effectively deletes an entry 58 from the database 38. It is not necessary to specify deletion of a record 46 in the <entity> file 44 should deletion be desired because effective deletion of all <rel> entries 58 that point to an <entity> record 46 will assure that the record 46 is never read.

The loop formed by process blocks 94, 97, 98, 100, 102 and 90 is repeated again but with the value of $PsA_{actual}$ being used to build the next fractional pseudo address $PsA_{frac}$ at process block 90, to produce a value of $PsA_{frac}$ equal to 5.1. At process block 90, the next larger integer physical address 6.0 is also built to replace $PsA_{int}$. Control passes through decision block 94 to process block 97 because there is an update database 60. The update <rel> <index> file 63 is read to retrieve an entry 61 with a pseudo address 68 value greater than or equal to (>=) 5.1. 7.1 is the $PsA_{actual}$ value returned so processing transfers from decision block 98 to decision block 100. PsA$_{actual}$ (7.1) is greater than (>) PsA$_{int}$ (6.0) so the program 71 transfers from decision block 100 to process block 96 where it reads the original <rel> file 42 to retrieve a record at physical location 6.

Referring to FIG. 3, decision block 78 in program 71 determines that PsA$_{actual}$ (6.0) is within the range (4 through 7.9) computed in process block 72. After reading the associated <entity> record 46 or 46' in process 74, process block 79 computes the next larger pseudo address PsA$_{frac}$ 6.1 and the next larger PsA$_{int}$ 7.0. The program 71 transfers to process block 76 where it reads <rel> entry 58 at physical location 7 just as it read location 6. Process block 79 then computes 7.1 for a PsA$_{frac}$ value and 8.0 for a PsA$_{int}$ value and loops again to process block 76. Process block 76 reads the update <rel> <index> file 63 and returns an entry 61 with a pseudo address key value of 7.1 and an associated physical address 4. PsA$_{actual}$ was found and is less than or equal to (<=) PsA$_{int}$ (8.0) so processing transfers from decision block 100 through decision block 102 to process block 104 where the entry 58' in the update <rel> file 64 at physical location 4 is read. The program 71 then returns to decision block 78.

The above shows sequential reads through the pseudo address space including reads to real addresses 3, 4, 6, 7 and pseudo address 7.1. Real address 5 is omitted because of deletion.

Figure 4:
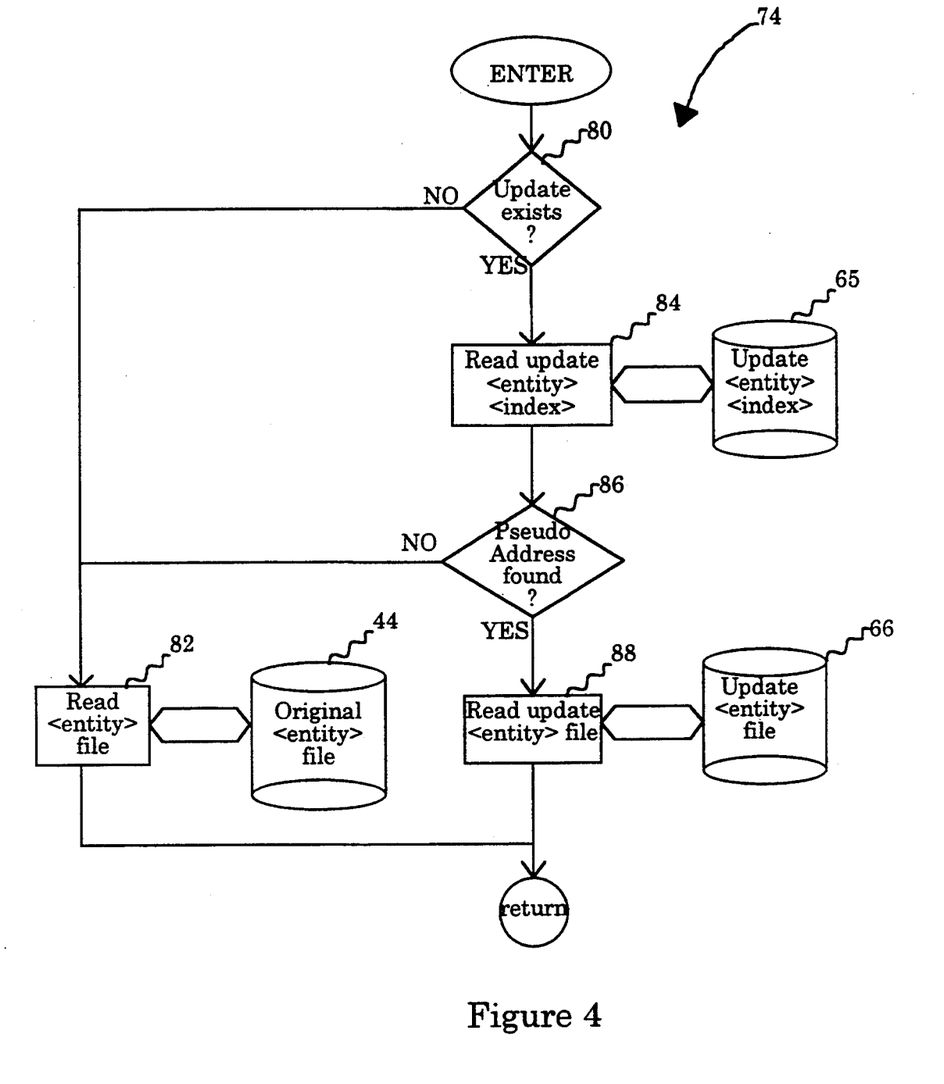
FIG. 4 is a flowchart showing the random read routine of FIG. 3.

Referring now to FIGS. 3 and 4, subroutine 74 randomly reads the record 46 or 46' associated with the <rel> entry 58 or 58'. As shown in FIG. 4, the first step of process block 74 is identifying whether an update database 60 exists, as indicated by decision block 80. Again, this step is a simple matter of seeing whether a floppy disk 36 with an update database 60 is installed.

If there is no update database 60, the subroutine 74 proceeds to process block 82 which reads a record 46 of the original <entity> file 44 as pointed to by an entry 58 in <rel> file 42, in turn as identified by an integer key number 54 from the <index> file 40. At the conclusion of the reading of the record 46 of <entity> file 44, the routine of subroutine 74 is exited.

If, however, at decision block 80 an update file exists, the program 71 proceeds to process block 84 to read the update <entity> <index> file 65 to see if a pseudo address 59 exists in the update <entity> <index> file 65 where the value of the pseudo address is equal to the physical address 47 or the pseudo address 77 previously found in process block 76. If no such pseudo address 59 is found, then at decision block 86, the program 71 proceeds to the process block 82, as has been previously described, to read the original <entity> file 44 at physical address 47.

If at decision block 86, a pseudo address 59 where the value of the pseudo address is equal to the physical address 47 or pseudo address 77 is discovered, then at process block 88, the update <entity> file 66 is read according to the integer address 75 provided in the entry 69 of update <entity> <index> file 65 corresponding to that found in physical address 47 or pseudo address 77.

Thus, it will be apparent that the operation of the routine of process block 74 will be to substitute a reading of the update <entity> file 66 for a reading of the <entity> file 44 when a physical address 47 or pseudo address 77 is found in the update <entity> <index> file 65. For example, if a physical address 47 of 701 occurs in an entry 69 in the update <entity> <index> file 65, then the program 71 will read the record 46' pointed to by the associated integer address 75 instead of the record 46 at physical address 701 pointed to by the physical address 47 in the <rel> file 42. Thus the present invention allows for the correction of an existing record 46 of the <entity> file 44.

Many modifications and variations of the preferred embodiment which will still be within the spirit and scope of the invention will be apparent to those of ordinary skill in the art. For example, it will be clear from this description that the incrementing of the pseudo address by a fractional part, to create an elastic data space amenable to updating might be accomplished by decrementing a pseudo address by a fractional part with a simple substitution of operations. Accordingly, the term incrementing should be construed generally to cover changing the pseudo address by a fractional part. In order to apprise the public of the various embodiments that may fall within the scope of the invention, the following claims are made.

I claim:

1. A method for virtually updating a database contained in an electrically readable storage device having stored files including:
    an index file relating an index term to an integer key address and a number of records,
    an original relation file relating the integer key address to one or more original pointing address, and
    an original entity file holding original records at integer entity addresses,
    the updating being according to an update index file relating a pseudo address to an update pointing address; and
    an update entity file holding update records at update addresses;
    the updating comprising the steps of:
    a) receiving an index term;
    b) electronically reviewing the index file to obtain the integer key address corresponding to the index term;
    c) building a pseudo address having a value offset from the value of the integer key address by a fractional increment where fractional increments may be zero;
    d) electronically reviewing the update index file and if the pseudo address is in the update index file designating the update pointing address related to the pseudo address as the update address and otherwise designating an original pointing address related to the key address by the original relation file as as a designated integer entity address; and
    e) reading the update record designated by the update address if the pseudo address is in the update index file and the update address is not a delete indication and reading the original record designated by the designated integer entity address if the pseudo address is not in the update index file.

2. The method of updating as recited in claim 1 wherein the delete indication is a value of zero.

3. The method of updating as recited in claim 1 wherein the electronically readable storage device is an optically readable memory.

4. The update method recited in claim 1 further including prior to step (c) the steps of:
    electronically reviewing the update index file to determine if the key address is in the update index file and if so, designating the key address as an update address and otherwise designating the key address as the entity address; and reading the update record designated by the update address if the key address is in the update index file.

5. A method of virtually updating a database contained in an electrically readable storage device, the database having:

an index file relating an index term to an integer key address and a number of records, an original relation file relating the integer key address to one or more pointing addresses, and an original entity file holding original records at integer entity addresses, the updating being by means of an update index file relating a pseudo address to an update pointing address of an update relation file; and an update entity file holding update records at update addresses; the updating comprising the steps of:

a) receiving an index term;

b) electronically reviewing the index file to obtain the integer key address corresponding to the index term;

c) building a pseudo integer address having a value offset from the value of the integer key address by an integer;

d) building a pseudo fractional address having a value offset from the value of the integer key address by a fractional increment where the fractional increment may be zero;

e) electronically reviewing the update index file and if the pseudo fractional address is in the update index file designating the update pointing address related to the pseudo address as the update address and, if the pseudo fractional address is not in the update index file, designating the key address as a designated integer entity address;

f) reading the update record designated by the update address if the pseudo fractional address is in the update index file and the update address is not a delete address, and reading the original record designated by the designated integer entity address if the pseudo fractional address is not in the update index file; and g) repeating steps (d) through (f) until the pseudo fractional address is at least equal to the pseudo integer address.

6. The update method recited in claim 6 further including prior to step (c) the steps of:

electronically reviewing the update index file to determine if the key address is in the update index file and if so, designating the key address as an update address and otherwise designating the key address as the entity address; and reading the update record designated by the update address if the key address is in the update index file.

* * * * *